(12) United States Patent
Hennen

(10) Patent No.: US 6,982,107 B1
(45) Date of Patent: Jan. 3, 2006

(54) RELEASE LINER FOR PRESSURE SENSITIVE ADHESIVES

(75) Inventor: Eugene G. Hennen, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 925 days.

(21) Appl. No.: 08/929,863

(22) Filed: Sep. 15, 1997

(51) Int. Cl.
*B32B 9/00* (2006.01)

(52) U.S. Cl. .................. 428/40.1; 428/41.3; 428/41.7; 428/41.8; 428/446; 428/451

(58) Field of Classification Search ............... 428/40.1, 428/41.3, 41.7, 41.8, 446, 451
See application file for complete search history.

(56) References Cited

U.S. PATENT DOCUMENTS

| | | | |
|---|---|---|---|
| 2,588,367 A | 3/1952 | Dennett | 260/13 |
| RE24,906 E | 12/1960 | Ulrich | 206/59 |
| 3,960,810 A | 6/1976 | Chandra et al. | 260/46.5 |
| 4,162,356 A | 7/1979 | Grenoble | 528/31 |
| 4,181,752 A | 1/1980 | Martens et al. | 427/54.1 |
| 4,306,050 A | 12/1981 | Koerner et al. | 528/26 |
| 4,339,485 A | 7/1982 | Shibano et al. | 428/40 |
| 4,818,610 A | 4/1989 | Zimmerman et al. | 428/345 |
| 4,822,687 A | 4/1989 | Kessel et al. | 428/447 |
| 4,830,910 A | 5/1989 | Larson | 428/336 |
| 5,110,667 A | 5/1992 | Galick et al. | 428/202 |
| 5,167,995 A | 12/1992 | Johnson et al. | 428/40 |
| 5,178,924 A | 1/1993 | Johnson et al. | 428/40 |
| 5,206,075 A | 4/1993 | Hodgson, Jr. | 428/216 |
| 5,217,805 A | 6/1993 | Kessel et al. | 428/352 |
| 5,221,394 A | 6/1993 | Epple et al. | |
| 5,332,797 A | 7/1994 | Kessel et al. | 528/27 |
| 5,576,356 A | 11/1996 | Leir et al. | 522/31 |
| 5,589,434 A * | 12/1996 | Takahara et al. | 503/227 |
| 5,663,116 A * | 9/1997 | Kamimura et al. | 503/227 |
| 5,691,022 A | 11/1997 | Knauf | |
| 5,700,571 A * | 12/1997 | Logue et al. | 428/532 |
| 5,728,469 A * | 3/1998 | Mann et al. | 428/418 |
| 5,840,783 A * | 11/1998 | Momchilovich et al. | 522/412 |
| 5,972,480 A * | 10/1999 | Yoshikawa et al. | 428/195 |

FOREIGN PATENT DOCUMENTS

| | | |
|---|---|---|
| DE | 2736499 | 2/1979 |
| GB | 1375792 | 11/1974 |
| JP | 02175776 | 7/1990 |
| JP | XP 002087319 | 12/1993 |
| WO | WO 93/11933 | 6/1993 |
| WO | WO 94/16885 | 8/1994 |

OTHER PUBLICATIONS

*Handbook of Pressure Sensitive Adhesive Technology*, Satas (Donatas), 1989, 2nd edition, Van Nostrand Reinhold, pp. 585-600.

"Thermoplastic Elastomers", *Handbook of Plastics, Elastomers, and Composites, 3rd Edition*; Charles A. Harper, Ed.; McGraw0Hill: New York; Chapter 5, pp. 5.1-5.44 (1996).

J.A. Brydson in *Plastics Materials, 6th Edition*; Butterworth Heinemann: Oxford, England; pp. 251, 252, 291, 292, 856-858 (1995).

Polymer Technology Dictionary, 1st Edition; T. Whelan, Consultant; Chapman & Hall: London; pp. 125, 126, 378, 438-443 (1994).

D&S Plastics Int'l, Technical Data Sheets (DEXFLEX E-1501 and DEXFLEX SB814).

* cited by examiner

*Primary Examiner*—Harold Pyon
*Assistant Examiner*—Alicia Chevalier
(74) *Attorney, Agent, or Firm*—Lisa P. Fulton

(57) ABSTRACT

A release liner for use with a pressure sensitive adhesive. The release liner includes a film of a thermoplastic elastomeric olefin.

51 Claims, No Drawings

RELEASE LINER FOR PRESSURE SENSITIVE ADHESIVES

FIELD OF THE INVENTION

This invention relates to a release liner for pressure sensitive adhesive articles.

BACKGROUND OF THE INVENTION

Currently, many pressure-sensitive adhesive tapes and other pressure-sensitive adhesive-coated articles have a release liner applied to the adhesive during or following manufacture. For example, the release liner can serve as a carrier for a pressure sensitive adhesive transfer tape or a double-coated tape, both of which are tacky on both sides of the tape. The adhesive tape on a release liner is typically supplied on a convolutely wound roll, and then unwound and laminated to an article or substrate. The release liner is typically left in place while the article is converted, packaged, and shipped to ultimate users, and in many instances is left in place until the article is bonded to and adhered to another substrate with the pressure-sensitive adhesive. Release liners are used for one or more of a number of purposes, including, for example, preventing contamination of the adhesive layer, facilitating handling of the adhesive-coated article (e.g., by providing support thereto as well as covering the adhesive), identifying the articles to which they are applied, etc.

The type of adhesive is typically matched to the type of release liner. For example, state-of-the-art release liners for acrylic pressure-sensitive tapes are polyethylene or polypropylene films. These films have been successfully used for acrylic pressure-sensitive adhesives for many years because they do not require a separate coating (e.g. silicones) to provide a release surface. Silicone-coated polyester release liners are also well-known in the art.

Conventional polyolefin-based or polyester release liners that function well at ambient temperatures are, however, often unsuitable for use in manufacturing processes that involve heating and cooling a substrate after application of an adhesive tape but before removal of the release liner. For example, during the painting process, painted thermoplastic automobile parts are typically exposed to temperatures of about 250° F. or higher for extended periods of time to cure the paint and then cooled. It is often desirable to apply an adhesive tape with a release liner to an unpainted substrate, paint the substrate and cure the paint at high temperature, then remove the release liner after cooling. Polyethylene release liners, however, cannot withstand high temperatures used in paint curing ovens and can melt, shrink or buckle during procedures that involve heating and cooling. Silicone-coated polyester liners can withstand high temperatures, but are also unsuitable for applications that involve thermal cycling because they do not expand and contract at the same rate as thermoplastic polyolefin substrates when heated and cooled, and the polyester liners tend to pull away from the ends of the adhesive tape upon heating or buckle upon subsequent cooling.

What is needed in the industry is a release liner for pressure sensitive adhesives, particularly for acrylic foam tapes, that is suitable for use in manufacturing applications that involve heating and cooling of a substrate.

SUMMARY OF THE INVENTION

The present invention provides a release liner for pressure sensitive adhesive articles such as single- or double-sided tapes, films, labels, and the like. The release liner of the present invention comprises a thermoplastic elastomeric olefin (TEO). TEO imparts thermal stability to the liner so that it is not likely to significantly decompose or melt when exposed to elevated temperatures during manufacturing and processing of a typical substrate to which it is applied. The use of TEO in the release liner also decreases the likelihood that the liner will shrink away significantly from the adhesive upon heating, or significantly buckle upon cooling. The release liner of the present invention is thus especially suitable for, although not limited to, use in manufacturing processes conducted at elevated temperatures, particularly those that involve heating to temperatures, such as exposure to temperatures of about 90° C. to about 150° C. for periods of up to one-half hour or one hour or more, followed by cooling to room temperature (i.e., about 20° C. to about 25° C.).

Preferably the release liner is a film, i.e. a sheet material, having at least one release surface comprising a release material such as a silicone, polyethylene, fluorocarbon, or polypropylene. The release surface can be provided as an integral part of the release liner, or, alternatively, in the form of a separate release layer or coating. The release surface imparts to the release liner the surface adhesion and release characteristics desired in view of the adhesive to which the liner is to be applied. It also functions to create a coherent surface to which the pressure-sensitive adhesive can be laminated.

A preferred embodiment of the release liner comprises (i) a TEO core and (ii) a release layer or coating comprising a release material comprising a polyethylene, polypropylene, fluorocarbon, or silicone. The release layer or coating provides the release surface that contacts the adhesive. The TEO core may be composed exclusively of a TEO, or may be a blend of TEO and one or more other materials such as polyethylene.

In another preferred embodiment, the release liner comprises a mixture, preferably a blend, of TEO and at least one other material, preferably a release material such as polyethylene or silicone, in proportions so as to provide the release surface as an integral part of the release liner; a separate release coating or layer is not included.

The present release liner is preferably tear-resistant. It preferably exhibits a low release value from acrylate-based adhesives, as described below, and has high cross web strength. A nick or tear in the release liner of the present invention typically will not propagate like a tear in a polyethlyene or polypropylene liner. When present, the release coating further reduces stress on the release liner during removal from the adhesive.

Also provided by the invention is a method for making a release liner for use with an adhesive applied to a substrate during a heating and cooling cycle. The method involves fashioning a release liner from a material that exhibits thermal expansion and contraction properties similar to those observed for the intended substrate. For example, the coefficients of thermal expansion and contraction of the substrate can be measured, and an extrudable material exhibiting similar thermal coefficients can be selected or fabricated. A film comprising the selected material is extruded, and at least one release surface is provided on the film for release of the film from the adhesive. The extruded film is thermally stable under the manufacturing or processing conditions (e.g., a thermal cycle involving exposure to an elevated temperature for a defined period of time) to which the intended substrate (after application of the adhesive with liner) will be subjected. Preferably, the intended substrate comprises a TEO, and the release liner is also formulated from a TEO, preferably an extrusion grade of the same TEO. In a particularly preferred embodiment of the method of the invention, the intended substrate is an automobile body part comprising TEO.

The present invention further provides a method for using a release liner during heating and cooling of an intended substrate. A release liner is adhered to a pressure sensitive adhesive, then applied to a substrate. The substrate is exposed to elevated temperatures for a period of time, then returned to room temperature. The release liner does not significantly buckle or substantially shrink away from the pressure-sensitive adhesive during the heating or cooling processes, and preferably remains coextensive with the pressure-sensitive adhesive after being returned to room temperature.

DETAILED DESCRIPTION OF PREFERRED EMBODIMENTS

Preferred release liners of the invention take the form of a film (i.e., a sheet material) comprising a thermoplastic elastomeric olefin (TEO). As used herein, the terms release liner, liner, release film and release sheet are interchangeable. Thermoplastic elastomeric olefins (TEOs), also referred to in the art as thermoplastic polyolefins (TPOs), are a class of materials which are both thermoplastic and elastic in nature. TEO is typically a blend of a rubbery material, such as, for example, an ethylene propylene rubber (such as ethylene-propylene monomer [EPM] or ethylene-propylene-diene-monomer [EPDM]), a nitrile rubber, or a styrene butadiene rubber, with a thermoplastic (such as polypropylene, polyethylene, or polyvinyl chloride), and is often compounded with a variety of additives and fillers, such as carbon black, plasticizers, antidegradants, fillers, and the like. TEO is commercially available typically as a blend of polypropylene and EPDM. Alternatively, the TEO can be formed by copolymerizing a thermoplastic, for example polypropylene, with a rubbery material, such as ethylene-propylene rubber. The rubbery material can be either vulcanized or not vulcanized.

The relative proportion of thermoplastic, preferably polypropylene, to rubbery material in a TEO can range from about 15% by weight thermoplastic to about 85% thermoplastic, and about 85% rubbery material to about 15% rubbery material, respectively. The higher the amount of thermoplastic, the more brittle and the more like a thermoplastic the TEO is. A higher amount of rubbery material will make the TEO closer to rubber in characteristics. TEOs are formulated to produce the desired end-use characteristics. Accordingly, the various TEOs useful for liners in the practice of the invention are selected so as to provide the release liner with expansion and contraction characteristics that match or approximate those of the substrate, preferably a TEO substrate, to which it will be adhered.

Preferably, the TEO used in the release liner comprises from about 30% to about 70% by weight thermoplastic, and about 70% to about 30% rubbery material. More preferably, the TEO comprises from about 40% to about 60% by weight thermoplastic, and about 60% to about 40% by weight rubbery material. Particularly preferred because of its commercial availability is a TEO comprising polypropylene and ethylene propylene rubber. The preferred ranges of thermoplastic to rubbery material are particularly suitable for liners used to protect pressure-sensitive adhesive tapes on TEO substrates such as those used in many current automotive body side moldings.

In addition to providing the release liner with increased stability at elevated temperatures and an improved ability to expand and contract upon heating and contract in concert with its intended substrate, TEO as a component of the liner can also impart tear resistance without the use of a woven (fiber) or nonwoven reinforcing layer. This is advantageous because the use of other layers can limit the amount of elasticity and flexibility of the liner, and thereby limit the uses of the pressure-sensitive adhesive article.

TEOs useful in the practice of the invention include commercially available TEOs such as those available under the DEXFLEX trade name from D & S Plastics Intl. (Auburn Hills, Mich.), those under the ALCRYN trade name available from DuPont Co. (Wilmington, Del.), those under the MULT-FLEX trade name available from Multibase (Copley, Ohio), and those under the POLYTROPE TPP trade name available from A. Schulman (Akron, Ohio). The grade of TEO is selected for the type of processing that will be used to make the release liner, and is preferably an extrusion grade, such as DEXFLEX SB-814 available from D & S Plastics Intl. Commercially available TEOs may include other additives such fillers, processing aids, plasticizers, and the like.

The release liner of the invention can be made by processes that are commercially known, and available. These processes include blown film extrusion or coextrusion for films having multiple layers and sheet extrusion or coextrusion. The films can be made in thicknesses of about 0.0005 inch to about 0.010 inch, and preferably in thicknesses of about 0.001 inch to about 0.008 inch. Generally, thinner films are desired for cost considerations, but it may be necessary to use thicker films to obtain certain properties such as tear resistance, tensile strength, and the like.

Various additives may be blended into the TEO resin prior to extrusion, or they may be added directly to the extruder. The additives are included in typical amounts for the purpose for which they are intended, and include fillers, colorants (e.g., dyes or pigments), slip agents, anti-blocking agents, processing aids, and the like.

Anti-blocking agents are particularly useful for outer layers of polyethylene to prevent sticking or blocking between layers of polyethylene when the extruded film is wound onto a roll. Useful materials include diatomaceous earth either by itself, or preferably in a low density polyethylene binder. Antiblocking agents are typically included in amounts of from about 1% to about 20% by weight of the polyethylene resin, and preferably in amounts of from about 3% to about 8%.

Polyethylenes are useful as processing aids to enhance the extrusion and film flatness of TEO resins. They can optionally be blended with the TEO to affect the release characteristics of the film. Any type of polyethylene may be used, and low density polyethylene and linear low density polyethylene are preferred. The polyethylenes can be used in amounts from about 1% to 99% by weight, and is preferably used in amounts of about 15% or greater.

Colorants (e.g., dyes or pigments) are useful as additives and are typically used in amounts of about 0.1% to about 5% by weight of the film composition, and preferably from about 0.3% to about 3%.

In one embodiment of the release liner of the invention, the TEO is provided in a film core (referred to herein as a TEO film core or simply TEO core) to which a release coating or layer is or can be applied. The TEO core can be exclusively TEO (including, optionally, additives, fillers, and the like), or, alternatively, can be a mixture or blend of TEO and one or more other polymers such as polyethylene. In this embodiment it is not necessary that the polymer with which the TEO is blended to form the TEO core be effective to impart the desired release properties to the film (although it may be), because the release surface is provided by the release coating or layer. Preferably, the TEO core comprises from about 5% by weight to about 100% by weight TEO, and more preferably from about 10% to about 100% TEO. The selection of the relative amounts of TEO and other polymer is determined by the end properties needed for the release liner, e.g., tensile strength, tear resistance, etc. The release coating (described in more detail below) is or can be applied to one or both sides of the TEO film core, depending upon the intended use and the release characteristics desired. Typically, the release coating for this embodiment is in the form of a layer that constitutes about 7% to about 15% of the total thickness of the release liner. When the adhesive is present on a substrate, the TEO core and the release coating are substantially co-extensive throughout at least that portion of the liner which is contacted to the adhesive-coated portion of the substrate.

In a second embodiment, the release liner of the invention further comprises a release material such as a polyethylene, polypropylene, fluorocarbon or silicone, in such proportion so as to provide the release surface as an integral part of the release liner. This is preferably achieved by mixing, preferably by blending, a TEO with at least one other material selected to impart the desired release properties to the TEO blend when formed into a film; commercially available TEO typically does not itself provide a suitable release because it adheres too strongly to the adhesive. However, a TEO can be formulated, e.g., by varying the amount of thermoplastic such as polyethylene or polypropylene, so as to provide an integral release surface without the need for blending with another release material. In this embodiment of the invention, inclusion of a separate surface release coating or layer is optional.

Suitable materials with which TEO can be mixed to integrate the desired release properties into the release liner of the second embodiment include polymers such as polyolefins, preferably polyethylenes and polypropylenes, and copolymers of ethylene such as ethylene vinyl acetate. Preferably, the TEO is mixed with polyethylene. For a release liner of the second embodiment that is particularly useful with acrylic adhesives, a polyethylene is blended with TEO in relative amounts of about 95% to about 50% by weight polyethylene and about 5% to about 50% by weight TEO, more preferably about 90% to about 60% by weight polyethylene and 10% to 40% by weight TEO. The preferred blends of TEO and polyethylene provide acceptable release properties from acrylic adhesives without a separate release coating. As the percentage of TEO increases, and the percentage of polyethylene decreases, the pressure-sensitive adhesive adheres more tightly to the liner and removal of the liner becomes more difficult. This is particularly true if the adhesive and liner are heated at an elevated temperature because heat tends to promote an increase in adhesion of pressure-sensitive adhesives to liners.

Useful polyethylenes for both the first and second embodiments include high density polyethylenes having a typical density around 0.96 g/cc (grams/cubic centimeter), medium density polyethylenes having a typical density of about 0.93 g/cc to about 0.94 g/cc, low density polyethylenes having densities of about 0.90 g/cc to about 0.92 g/cc, linear low density polyethylenes, and very low density polyethylenes having densities below about 0.90 g/cc. In general, the higher the density, the higher the release force needed to remove the liner from a pressure-sensitive adhesive. Lower density polyethylenes provide lower release values. The selection of the material depends upon the desired release properties. Polyethylenes of different densities can be blended together, or they can be blended with ethylene co-polymers to provide the desired properties. For example, a blend of high density polyethylene with a low density polyethylene can be used to make a medium density polyethylene having intermediate release values between high and low density polyethylenes.

Another useful polyethylene for use in the TEO mixtures of both the first and second embodiments is a very low density polyethylene formed as a copolymer of ethylene and an alpha olefin having from about 3 to about 10 carbon atoms using a metallocene polymerization catalyst. Suitable alpha-olefins include butene-1, hexene-1, octene-1, and combinations thereof. The copolymers have a density of less than about 0.90 g/cc, preferably less than about 0.89 g/cc, and more preferably, less than about 0.88 g/cc. The copolymers also have a narrow molecular weight distribution as defined by having a polydispersity of about 1 to about 4, and preferably about 1.5 to about 3.5. The polydispersity is defined as the ratio of the weight average molecular weight to the number average molecular weight. Additionally, the copolymers can be characterized by a composition distribution breadth index (referred to hereinafter as "CDBI"). The CDBI is defined as the weight percent of the copolymer molecule having a co-monomer content within 50 percent (i.e., +/−50%) of the median total molar co-monomer content. The CDBI and the method for its determination is described in U.S. Pat. No. 5,206,075, incorporated herein by reference. The CDBI of suitable copolymers is preferably greater than 70% and more preferably greater than 80%. Suitable copolymers are commercially available from Exxon Chemical Co. under the EXACT tradename and from Dow Chemical Co. under the ENGAGE trade name.

Release coatings or layers applied to the TEO film core in the first embodiment preferably include a release material comprising a polyolefin, more preferably polyethylene or polypropylene, that imparts the desired release characteristics to the liner. Other release materials that can be used as coatings or outer layers with the first embodiment of the release liner include silicones, e.g., polysiloxanes, epoxy silicones, as well as perfluoroethers, fluorocarbons, polyurethanes, and the like. Release materials are known and are described in various sources including patent literature. For example, epoxy silicones are disclosed in U.S. Pat. No. 4,822,687 (Kessel et al.), U.S. Pat. No. 5,217,805 (Kessel et al.), U.S. Pat. No. 5,576,356 (Kessel et al.), U.S. Pat. No. 5,332,797 (Kessel, et al.); perfluoropolyethers are disclosed in U.S. Pat. No. 4,830,910 (Larson), fluorocarbons in a polymer matrix are disclosed in U.S. Pat. No. 5,110,667 (Galick et al.) and various types of silicones are described in U.S. Pat. No. 2,588,367 (Dennett), U.S. Pat. No. 3,960,810 (Chandra et al.), U.S. Pat. No. 4,162,356 (Grenoble), U.S. Pat. No. 4,306,050 (Koerner et al.); British Patent No. 1,375,792 (Colquhoun et al.), and German Patent No. 2,736,499 (Hockemeyer), each of which is incorporated herein by reference. Commercially available release materials are available from various suppliers such as General Electric Co. (Albany, N.Y.), Dow Corning under to SYL-OFF tradename, (Midland, Mich.), Wacher Chemie (Germany), and Th. Goldschmidt AC (Germany). Coatings are commercially available from Akrosil (Menasha, Wis.), and Daubert (Willowbrook, Ill.).

Release materials can be applied to the TEO core as solvent or water-based coatings, solventless coatings, hot melt coatings, or they can be co-extruded with the TEO core using conventional processes. Solvent and water-based coatings are typically applied to the TEO core by processes such as roll coating, knife coating, curtain coating, gravure coating, wound rod coating, and the like. The solvent or water is then removed by drying in an oven, and the coating is optionally cured in the oven. Solventless coatings include 100% solids compositions such as silicones or epoxy silicones which are coated onto the TEO by the same types of processes used for solvent coating, and then cured by exposure to ultraviolet light. Optional steps include priming the TEO before coating or surface modification of the TEO such as with corona treatment. Hot melt coatings such as polyethylenes or perfluoroethers are 100% solids coatings which are heated and then applied through a die or with a heated knife. Hot melt coatings are preferably applied by co-extruding the release material with the TEO core in blown film or sheet extruder for ease of coating and for process efficiency.

The TEO core can be coated on one or both sides to provide a release liner of the first embodiment. The amount of release force, e.g., the force required to remove the liner from the adhesive, can range from almost zero to about 60 ounces per inch width (oz/in). When the release force is on the higher end of the range, i.e., above about 50 oz/in, it is difficult to start removal of the liner as well as to continue removal of the liner once a part of the liner has been removed from the adhesive. With high removal forces, the liner can tear or the adhesive may be pulled away from the intended substrate causing distortion or wrinkling of the adhesive and adversely affecting the adhesive holding power. The lower end of the removal force range, e.g., less than about 5 oz/in is typically known as the "premium release" and these values are usually obtained with silicone coatings. At times, premium release may not be desired if the liner releases too easily and pops off of the adhesive to expose the adhesive to dirt and other contamination. Release values of about 15 to about 45 oz/in are suitable for most applications so that the liner adheres well enough to the adhesive to avoid popping off while remaining easily removable.

The release surface of the release liner of the invention thus preferably exhibits a release value of less about 60 oz./inch, more preferably less than about 45 oz./inch, most preferably less than about 30 oz./inch, as measured in the Release Force Test Method described below. Where the release material comprises a silicone, the release value of the release surface of the liner is preferably less than about 10 oz./inch, more preferably less than about 5 oz/inch.

When both sides are coated, the coatings on each side may be the same or they may be different to provide a differential release. For differential release, the release liner will have a higher release force on one side than the other. For example, one side of a release liner may be coated with a silicone release material having a release force from a pressure sensitive adhesive of 10 ounces/inch (oz/in) and the other side may have a silicone release material having a release force of 20 oz/in. This ensures that the adhesive will adhere more tightly to one side of the liner than the other so that when a roll of tape is unwound, the adhesive consistently stays on the same side of the release liner.

The liner of the invention is useful for any type of pressure-sensitive adhesive used in the industry. This includes pressure-sensitive adhesives based on acrylate or acrylics, polyesters, silicones, block copolymers, ethylene vinyl acetate, and the like. The selection of the release surface will depend upon the type of pressure-sensitive adhesive to which it is adhered. For example, release surfaces of polyethylene, polypropylene, perfluoroethers, and silicone are useful with acrylate pressure-sensitive adhesives, and perfluoroethers are useful for silicone pressure-sensitive adhesives.

Useful pressure sensitive adhesives in the practice of this invention include acrylic adhesives, natural rubber adhesives, tackified block copolymer adhesives, polyvinyl acetate adhesives, ethylene vinyl acetate adhesives, silicone adhesives, polyurethane adhesives, thermosettable pressure-sensitive adhesives such as epoxy acrylate or epoxy polyester pressure-sensitive adhesives, and the like. These types of pressure-sensitive adhesives are known in the art and are described in the *Handbook of Pressure Sensitive Adhesive Technology*, Satas (Donatas), 1989, $2^{nd}$ edition, Van Nostrand Reinhold, as well as the patent literature. The pressure sensitive adhesives may also include additives such as cross-linking agents, fillers, gases, blowing agents, glass or polymeric microspheres, silica, calcium carbonate fibers, surfactants, and the like. The additives are included in amounts sufficient to effect the desired properties.

The release liner of the invention is preferably used with a heat-stable, pressure-sensitive, adhesive. Heat stable, pressure-sensitive adhesives include acrylate pressure-sensitive adhesives such as, for example those described in Re 24906 (Ulrich), U.S. Pat. No. 4,181,752 (Martens et al.), U.S. Pat. No. 4,818,610 (Zimmerman et al.) and silicone pressure-sensitive adhesives. The adhesives can be prepared by any of the known methods including emulsion polymerization, solvent polymerization, e-beam polymerization, ultraviolet light polymerization, and the like. Typically, acrylate adhesives are homopolymers and copolymers of monofunctional unsaturated acrylic or methacrylic acid ester monomers of non-tertiary alcohols having from about 1 to about 20 carbon atoms, and preferably from about 4 to about 12 carbon atoms. A co-monomer may optionally be included to improve the cohesive strength of the adhesive. Such reinforcing co-monomers useful in making the copolymers typically have a higher homopolymer glass transition temperature than the glass transition temperature of the acrylic acid ester homopolymer.

Suitable acrylic acid ester monomers include 2-ethylhexyl acrylate, isooctyl acrylate, isononyl acrylate, n-butyl acrylate, decyl acrylate, dodecyl acrylate, octadecyl acrylate, and mixtures thereof. Preferred monomers include isooctyl acrylate, n-butyl acrylate, and mixtures thereof. Useful reinforcing co-monomers include acrylic acid, methacrylic acid, itaconic acid, acrylamide, substituted acrylamides, N-vinyl pyrrolidone, N-vinyl caprolactam, isobornyl acrylate, and cyclohexyl acrylate. Preferred co-monomers include acrylic acid, N-vinyl caprolactam, and isobornyl acrylate.

In a typical process to make pressure sensitive adhesive transfer tapes, an adhesive composition is coated onto a release liner. The adhesive is then cured to form a gelled film on the liner, and the release liner with the adhesive is rolled up into a large roll. Alternatively, the adhesive may be coated and cured on one liner, and then transferred onto a different liner before converting. The adhesive coated sheet is then converted into narrow rolls by slitting the large roll and winding the narrow width tape onto cores for customer use. The liners of the invention can also be used with foam tapes such as 5605 and 5344 Acrylic Foam Tapes available from Minnesota Mining & Manufacturing Co. (St. Paul, Minn.), as well as double coated tapes.

The release liner of the invention is preferably thermally stable (i.e., stable to heat), that is, it retains structural integrity insofar as it will not melt or decompose significantly at elevated temperatures used in the manufacturing or processing of an intended substrate. A preferred release liner retains structural integrity when exposed to temperatures of about 90° C., more preferably about 120° C., most preferably about 150° C., for a period of about 20 minutes, more preferably for a period of about one-half hour, most preferably for a period of about one hour.

The release liner of the invention preferably exhibits substantially no shrinking or buckling when brought to room temperature after being exposed to an elevated temperature for an extended period of time. A preferred liner exhibits substantially no shrinking or buckling when brought to room temperature (i.e., about 20–25° C.) after being exposed to a temperature of about 90° C., more preferably about 120° C., most preferably about 150° C., for a period of about one-half hour, more preferably about one hour. Shrinking and buckling can be avoided by selecting a release liner having thermal expansion and contraction coefficients substantially similar to those of the intended substrate. The coefficients of thermal expansion and contraction of the release liner are preferably within at 10% of the thermal expansion and contraction coefficients of the intended substrate or article to which an adhesive film comprising the liner is applied.

Although preferred embodiments of the release liner of the invention are thermally stable, tear-resistant, and/or exhibit substantially no shrinking or buckling when brought to room temperature after being exposed to an elevated temperature for an extended period of time, it is to be understood that the present invention is not to be unnecessarily limited. Accordingly, any release liner for use with a pressure sensitive adhesive, which release liner comprises a TEO, is within the scope of the present invention.

The following non-limiting examples further illustrate the present invention. Unless otherwise indicated, the following test procedures were used in the examples. The particular materials and amounts thereof recited in these examples, as well as other conditions and details, are to be interpreted to apply broadly in the art and should not be construed to unduly restrict or limit the invention in any way.

TEST METHODS

Release Force

Samples are prepared by laminating the release side or surface of the liner to the adhesive side of a pressure-sensitive adhesive tape (5344 Acrylic Foam Tape Minnesota Mining & Manufacturing Co., St. Paul, Minn.) using a hand roller to eliminate air pockets. The other side of the tape is protected with a standard polyethylene release liner. Strips measuring 2.54 cm wide by 17.8 cm long are cut and then aged for 3 days at room temperature (about 20–25° C.) and tested, or aged at 70° C. for 7 days and tested. To test, the standard polyethylene liner is removed and the adhesive tape is laminated to the bed of an IMASS Adhesion Tester (Imass Inc. Hingham, Mass.). The liner is then pulled away from the adhesive at a 180 degree angle and a speed of 30 cm/minute. The force required to remove the liner is reported in ounces/inch (oz/in).

Tear Resistance

A 5.08 cm by 15.24 cm sample of the liner is cut with the 5.08 cm dimension being the minor axis and the 15.24 dimension being the major axis. The major axis is the test direction (downweb or crossweb). A 1.9 cm notch is cut from one edge at the middle of the minor axis and parallel to the major axis of the sample. The sample is placed in an INSTRON Tensile Tester (Instron Corp, Canton, Mass.) having a 2.54 cm jaw separation such that the notch is positioned in line with the jaws. The jaws are separated at a speed of 19.7 cm per minute and the average force required to tear the sample is recorded. Samples are run in both the downweb direction and the crossweb direction. The test results are recorded in pounds.

Expansion and Contraction on a TEO Substrate

The substrate used in this example is an injection molded thermoplastic polyolefin (DEXFLEX 777, D & S Plastics Intl., Auburn Hills, Mich.) body side molding obtained from Lexamar (Boyne City, Mich.). The molding is about 4 feet in length. The release liner is laminated to an adhesive tape (5344 Acrylic Foam Tape), and a 32 inch long strip of adhesive tape with the release liner is applied to the molding. The molding is then heated at 149° C. for 30 minutes, and then cooled to room temperature. The liner is examined for wrinkling or buckling, and whether or not the liner has shrunk and left exposed adhesive at the ends of the tape.

EXAMPLE 1

A film was prepared by extruding a blend of 85 parts of TEO (thermoplastic elastomeric olefin) and 15 parts of LLDPE (linear low density polyethylene), and about 1 part of a red pigment (PM4532 available from Techmer, Clinton, Tenn.) to a thickness of 0.153 mm thick using a blown film extruder. The TEO was a thermoplastic polyolefin having fillers and constituting a 50/50 blend of polypropylene and EPDM (ethylene propylene diene monomer). It was obtained as DEXFLEX SB-814 from D&S Plastics Intl. (now Solvay Engineered Plastics, Auburn Hills, Mich.). The LLDPE was a linear low density polyethylene available as ESCORENE LD117.85 from Exxon Chemical Co. (Houston, Tex.). The blown film extruder was run to achieve sufficiently high melt flow temperatures to provide a uniform flat film. Extruder temperatures ranged from about 177° C. to about 205° C. The film was then coated on each side with ultraviolet cured silicone compositions available from Akrosil to make a release liner. Specifically, one side of the composite was coated with H2C (Akrosil), which has a low release value, and the other side was coated with H3B (Akrosil), which has a higher release value. The release liner was tested for release force on the H3B side. The release force after 3 days at room temperature (about 20–25° C.) was 0.96 oz/inch, and after 7 days at 70° C., the release force was 2.3 oz/inch. The liner was tested for expansion and contraction on a TEO substrate as described in the Test Methods above. It did not exhibit any visible shrinkage or wrinkling.

EXAMPLE 2

A 0.153 mm thick film composite was prepared by coextruding 0.127 mm of TEO (DEXFLEX SB-814) having about 1% red pigment (PM4532) as a core, 0.013 mm of LDPE (low density polyethylene) on one surface of the TEO, and 0.013 mm of MDPE (medium density polyethylene) on the other surface of the TEO, on a blown film extruder. The low density polyethylene had a density of 0.92 g/cc and was obtained under the tradename PETROTHENE NA353 from Quantum Chemical Corp (Cincinnati, Ohio). The medium density polyethylene had a density of about 0.93 g/cc and was a blend of 33 parts by weight LDPE (PETROTHENE NA353) and 67 parts high density polyethylene having a density of 0.96 g/cc. It was obtained under the tradename PETROTHENE LT6180 from Quantum Chemical Corp. The medium and low density polyethylenes provided differential release surfaces for an acrylate pressure-sensitive adhesive. The release liner was tested for tear strength. The liner had a machine direction tear strength of 0.5 pounds and a cross direction tear strength of 4.9 pounds. The liner was tested for expansion and contraction on a TEO substrate as described in the Test Methods above. It did not exhibit any visible shrinkage or wrinkling.

EXAMPLES 3–6

A release liner was prepared by blending TEO (DEXFLEX SB-814), with varying amounts of a low density polyethylene as shown in Table 1, and forming a 0.153 mm thick film using a blown film extruder. The TEO was colored with a carbon black pigment. The polyethylene was DOWLEX 2045 which is a linear low density polyethylene having a density of 0.92 g/cc and a narrow molecular weight distribution. The liners were tested for release force as described above except that the samples were aged in an oven at 121° C. for 30 minutes and cooled to room temperature before testing. The release values are shown in Table 1. The data show that in the preferred ranges of TEO and polyethylene (Examples 5 and 6), acceptable release values (i.e., under about 40 oz/inch) are obtained. All of the liners were tested for expansion and contraction on a TEO substrate using the Test Method described above. None of them exhibited any visible shrinkage or wrinkling.

TABLE 1

| | TEO/LDPE Blends | | |
|---|---|---|---|
| Example | Parts TEO | Parts LDPE | Release Force oz/in |
| 3 | 80 | 20 | 55.4 |
| 4 | 60 | 40 | 65.2 |
| 5 | 20 | 80 | 39.4 |
| 6 | 10 | 90 | 29.1 |

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A release liner for use with a pressure sensitive adhesive, said release liner consisting of one or more layers, wherein each of said one or more layers consists of a thermoplastic elastomeric olefin (TEO) and a release material,
    wherein said release liner has at least one outer release surface for the pressure sensitive adhesive to which said release liner is to be applied.

2. A tape assembly comprising a pressure sensitive adhesive and the release liner of claim 1.

3. An article comprising a substrate and the tape assembly of claim 2.

4. An adhesive article comprising:
    (i) a release liner for use with a pressure sensitive adhesive, said release liner comprising a major surface, a release material, and one or more layers at least one of which is a film, each of said one or more layers comprising a thermoplastic elastomeric olefin (TEO), wherein said release material is on said major surface of said release liner and is in proportions sufficient to provide enough release material to provide said major surface as a release surface for the pressure sensitive adhesive to which said release liner is to be applied; and
    (ii) a pressure sensitive adhesive on said major surface of said release liner.

5. The adhesive article of claim 4 wherein the TEO comprises polypropylene.

6. The adhesive article of claim 4 wherein the TEO comprises an ethylene propylene rubber.

7. The adhesive article of claim 4 wherein the release liner has two major surfaces, wherein at least one of the two major surfaces is a release surface of said release material, said release material comprising at least one from the group consisting of silicone, polyethylene, polypropylene, fluorocarbon, or a mixture thereof.

8. The adhesive article of claim 4 wherein TEO is present in each layer in an amount of at least about 5% by weight.

9. The adhesive article of claim 8 wherein TEO is present in each layer in an amount of at least about 10% by weight.

10. The adhesive article of claim 8 wherein TEO is present in each layer in an amount of about 5% to about 50% by weight.

11. The adhesive article of claim 10 wherein TEO is present in each layer in an amount of about 10% to about 40% by weight.

12. The adhesive article of claim 4 wherein said release layer is a release coating.

13. The adhesive article of claim 4 wherein said film comprises a mixture of about 5% to about 50% thermoplastic elastomeric olefin (TEO) by weight, and about 95% to about 50% by weight of a polymer selected from group consisting of polyethylene, polypropylene, silicone, and mixtures thereof.

14. The adhesive article of claim 4 wherein the pressure-sensitive adhesive is an acrylic adhesive.

15. The adhesive article of claim 4 wherein said film has a thickness in the range of about 0.0005 inch (0.0127 mm) to about 0.010 inch (0.254 mm).

16. The adhesive article of claim 4 wherein said film has a thickness in the range of about 0.001 inch (0.0254 mm) to about 0.008 inch (0.2032 mm).

17. The adhesive article of claim 4 wherein said film provides a degree of tear resistance greater than the same film made from a propylene based polymer.

18. The adhesive article of claim 4 wherein said release liner will not melt or decompose significantly when exposed to temperatures of about 90° C. for a period of about 20 minutes.

19. The adhesive article of claim 4 wherein said release liner will not melt or decompose significantly when exposed to temperatures of about 90° C. for a period of about one-half hour.

20. The adhesive article of claim 4 wherein said release liner will not melt or decompose significantly when exposed to temperatures of about 90° C. for a period of about one hour.

21. The adhesive article of claim 4 wherein said release liner will not melt or decompose significantly when exposed to temperatures of about 120° C. for a period of about 20 minutes.

22. The adhesive article of claim 4 wherein said release liner will not melt or decompose significantly when exposed to temperatures of about 120° C. for a period of about one-half hour.

23. The adhesive article of claim 4 wherein said release liner will not melt or decompose significantly when exposed to temperatures of about 120° C. for a period of about one hour.

24. The adhesive article of claim 4 wherein said release liner will not melt or decompose significantly when exposed to temperatures or about 150° C. for a period of about 20 minutes.

25. The adhesive article of claim 4 wherein said release liner will not melt or decompose significantly when exposed to temperatures of about 150° C. for a period of about one-half hour.

26. The adhesive article of claim 4 wherein said release liner will not melt or decompose significantly when exposed to temperatures of about 150° C. for a period of about one hour.

27. A release liner for use with a pressure sensitive adhesive, said release liner comprising:
  (i) a film core having two major outermost surfaces and comprising a thermoplastic elastomeric olefin (TEO): and
  (ii) a release layer applied to both major outermost surfaces of said film core, said release layer consisting of at least one release material selected from silicone, polyethylene, polypropylene, and fluorocarbon and providing a release surface for the pressure sensitive adhesive to which said release liner is to be applied.

28. The release liner of claim 27 wherein said film core has a thickness in the range of about 0.0005 inch (0.0127 mm) to about 0.010 inch (0.254 mm).

29. The release liner of claim 27 wherein said film core has a thickness in the range of about 0.001 inch (0.0254 mm) to about 0.008 inch (0.2032 mm).

30. The release liner of claim 27 wherein said film core provides said release liner with tear resistance and tensile strength.

31. The release liner of claim 27 wherein said release layer constitutes in the range of about 7% to about 15% of the total thickness of the release liner.

32. The release liner of claim 27 wherein a different release layer is applied to each of the major outermost surfaces of said film core.

33. The release liner of claim 32 wherein one of said different release layer has a higher release force than the other.

34. An adhesive article comprising a release liner applied to a pressure-sensitive adhesive adhered to a substrate, wherein said release liner remains unwrinkled and coextensive with the adhesive at room temperature following (1) exposure of the substrate to which the adhesive article is adhered to a temperature of about 90° C. for a time period of about 20 minutes and (2) removal of the release liner and the pressure sensitive adhesive from the substrate.

35. The adhesive article of claim 34 wherein said release liner remains unwrinkled and coextensive with the adhesive at room temperature following (1) exposure of the substrate to which the adhesive article is adhered to a temperature of about 120° C. for a time period of about 30 minutes and (2) removal of the release liner and the pressure sensitive adhesive from the substrate.

36. The adhesive article of claim 35 wherein said release liner remains unwrinkled and coextensive with the adhesive at room temperature following (1) exposure of the substrate to which the adhesive article is adhered to a temperature of about 150° C. for a time period of about 30 minutes and (2) removal of the release liner and the pressure sensitive adhesive from the substrate.

37. The adhesive article of claim 34 wherein said release liner remains unwrinkled and coextensive with the adhesive at room temperature following (1) exposure of the substrate to which the adhesive article is adhered to a temperature of about 250° F. for a time period of about 60 minutes and (2) removal of the release liner and the pressure sensitive adhesive from the substrate.

38. The adhesive article of claim 34 wherein said release liner comprises one or more layers at least one of which is a film, each of said one or more layers comprising a thermoplastic elastomeric olefin (TEO), and at least one layer forming a major surface of said release liner and comprising a release material,
  wherein said release material is on said major surface of said release liner and is in proportions sufficient to provide enough release material to provide said major surface as a release surface for said pressure sensitive adhesive to which said release liner is applied.

39. The adhesive article of claim 38 wherein said release liner has a coefficient of thermal expansion and contraction that are within 10% of the thermal expansion and contraction coefficients of said substrate.

40. The adhesive article of claim 34 wherein said release liner comprises:
  (i) a film core having two major outermost surfaces and comprising a thermoplastic elastomeric olefin (TEO); and
  (ii) a release layer applied to at least one major outermost surface of said film core, said release layer consisting of at least one release material selected from silicone, polyethylene, polypropylene, and fluorocarbon and providing a release surface for the pressure sensitive adhesive to which said release liner is to be applied.

41. The adhesive article of claim 40 wherein said release liner has a coefficient of thermal expansion and contraction that are within 10% of the thermal expansion and contraction coefficients of said substrate.

42. An adhesive article comprising a release liner applied to a pressure-sensitive adhesive adhered to a substrate, said release liner comprising one or more layers, at least one of which is a film, each of said one or more layers comprising a thermoplastic elastomeric olefin (TEO), said release liner having at least one layer forming a major surface on said release liner and comprising a release material,
  wherein said release material is on said major surface of said release liner and is in proportions sufficient to provide enough release material to provide said major surface as a release surface for said pressure sensitive adhesive to which said release liner is applied.

43. The adhesive article of claim 42 wherein said substrate and pressure-sensitive adhesive form an adhesive backed tape.

44. The adhesive article of claim 43 wherein said substrate includes an acrylic foam.

45. The adhesive article of claim 42 wherein said substrate comprises an automotive body part.

46. The adhesive article of claim 45 wherein said automotive body part is a body side molding.

47. An adhesive article comprising a release liner applied to a pressure-sensitive adhesive adhered to a substrate, said release liner comprising:
 (i) a film core having two major outermost surfaces and comprising a thermoplastic elastomeric olefin (TEO); and
 (ii) a release layer applied to at least one major outermost surface of said film core, said release layer consisting of at least one release material selected from silicone, polyethylene, polypropylene, and fluorocarbon and providing a release surface for the pressure sensitive adhesive to which said release liner is to be applied.

48. The adhesive article of claim 47 wherein said substrate and pressure-sensitive adhesive form an adhesive backed tape.

49. The adhesive article of claim 48 wherein said substrate includes an acrylic foam.

50. The adhesive article of claim 47 wherein said substrate comprises an automotive body part.

51. The adhesive article of claim 50 wherein said automotive body part is a body side molding.

* * * * *

UNITED STATES PATENT AND TRADEMARK OFFICE
CERTIFICATE OF CORRECTION

PATENT NO. : 6,982,107 B1  
APPLICATION NO. : 08/929863  
DATED : January 3, 2006  
INVENTOR(S) : Eugene G. Hennen It is certified that error appears in the above-identified patent and that said Letters Patent is hereby corrected as shown below:

Title Page # 56 Other Publications

Column 2  
Line 6, after the word "McGraw" delete "()" and insert in place thereof -- - --.

Column 13  
Line 15, after the word "temperatures" delete "or" and insert in place thereof -- of --.

Signed and Sealed this

Twentieth Day of March, 2007

JON W. DUDAS  
*Director of the United States Patent and Trademark Office*